United States Patent
Roberts et al.

(10) Patent No.: US 10,144,096 B2
(45) Date of Patent: Dec. 4, 2018

(54) GAS TURBINE IN SITU INFLATABLE BLADDERS FOR ON-WING REPAIR

(71) Applicant: General Electric Company, Schenectady, NY (US)

(72) Inventors: Herbert Chidsey Roberts, Middletown, OH (US); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/077,027

(22) Filed: Mar. 22, 2016

(65) Prior Publication Data

US 2017/0274484 A1  Sep. 28, 2017

(51) Int. Cl.
  *B23P 6/00* (2006.01)
  *F01D 5/00* (2006.01)
  *F02C 3/04* (2006.01)

(52) U.S. Cl.
  CPC .............. *B23P 6/002* (2013.01); *F01D 5/005* (2013.01); *F02C 3/04* (2013.01); *F05D 2230/72* (2013.01); *F05D 2230/80* (2013.01)

(58) Field of Classification Search
  CPC ...... B23P 6/002; F01D 5/005; F05D 2230/72; F05D 2230/80; F02C 3/04
  See application file for complete search history.

(56) References Cited

U.S. PATENT DOCUMENTS

| | | | |
|---|---|---|---|
| 3,841,764 A | 10/1974 | Snell et al. | |
| 4,910,823 A | 3/1990 | Silverman et al. | |
| 5,644,394 A | 7/1997 | Owens | |
| 5,915,743 A | 6/1999 | Palma | |
| 6,235,352 B1 | 5/2001 | Leverant et al. | |
| 6,390,383 B1 | 5/2002 | Fusaro, Jr. et al. | |
| 6,431,837 B1 | 8/2002 | Velicki | |
| 6,640,437 B2 * | 11/2003 | McFarland | B25B 27/00 29/23.51 |
| 6,973,978 B2 | 12/2005 | Cravatte | |
| 7,146,725 B2 | 12/2006 | Kottilingam et al. | |
| 7,278,208 B2 | 10/2007 | Le Saint et al. | |
| 8,067,711 B2 | 11/2011 | Blankenship et al. | |

(Continued)

FOREIGN PATENT DOCUMENTS

| | | |
|---|---|---|
| CN | 1762657 A | 4/2006 |
| CN | 103822927 A | 5/2014 |

(Continued)

OTHER PUBLICATIONS

Extended European Search Report and Opinion issued in connection with corresponding EP Application No. 17160861.5 dated Aug. 2, 2017.

(Continued)

*Primary Examiner* — Moshe Wilensky
(74) *Attorney, Agent, or Firm* — General Electric Company; Brian Overbeck

(57) ABSTRACT

Methods are provided for securing a tool within a gas turbine engine. The method can include inserting a tool into the engine; inserting a bladder between a portion of the tool and a component in the engine; and inflating the bladder to temporarily secure the tool in its position. For example, two tools (or more) can be inserted into the engine and secured by the bladder.

18 Claims, 5 Drawing Sheets

(56) References Cited

U.S. PATENT DOCUMENTS

| | | |
|---|---|---|
| 8,191,504 B2 | 6/2012 | Blankenship et al. |
| 8,290,006 B1 | 10/2012 | Gradl et al. |
| 8,362,386 B2 | 1/2013 | Lau et al. |
| 8,822,874 B2 | 9/2014 | Zajchowski et al. |
| 9,085,053 B2 | 7/2015 | Tholen et al. |
| 2003/0213518 A1* | 11/2003 | Zielinski ............... B60P 7/065 137/223 |
| 2006/0083612 A1 | 4/2006 | Roney et al. |
| 2009/0208662 A1 | 10/2009 | Blankenship et al. |
| 2010/0061858 A1 | 3/2010 | Jones |
| 2011/0206533 A1 | 8/2011 | Lee et al. |
| 2012/0244289 A1 | 9/2012 | Blankenship |
| 2013/0167375 A1 | 7/2013 | Roesing et al. |
| 2013/0199040 A1 | 8/2013 | Dudeck et al. |
| 2014/0139831 A1 | 5/2014 | Gutschow et al. |
| 2014/0352483 A1 | 12/2014 | Robert, III et al. |
| 2014/0356109 A1 | 12/2014 | Whittenberger et al. |

FOREIGN PATENT DOCUMENTS

| | | |
|---|---|---|
| EP | 1 219 786 A2 | 7/2002 |
| EP | 1652954 A1 | 5/2006 |
| EP | 1743951 A2 | 1/2007 |
| EP | 1749583 A1 | 2/2007 |
| GB | 1296534 A | 11/1972 |

OTHER PUBLICATIONS

Machine translation and a copy of Chinese Office Action issued in connection with corresponding CN Application No. 201710174375.3 dated Jul. 4, 2018.

European Office Action issued in connection with corresponding EP Application No. 17160861.5 dated Aug. 1, 2018.

* cited by examiner

GAS TURBINE IN SITU INFLATABLE BLADDERS FOR ON-WING REPAIR

FIELD OF THE INVENTION

The present subject matter relates generally to gas turbine engines and, more particularly, to a system and method for performing an in situ repair of an internal component of a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively one row of nozzle vanes and one row of turbine blades make up a "stage" of the turbine. Typically, both the compressor and turbine include a plurality of successive stages.

Gas turbine engines, particularly aircraft engines, require a high degree of periodic maintenance. For example, periodic maintenance is often scheduled to allow internal components of the engine to be inspected for defects and subsequently repaired. Unfortunately, many conventional repair methods used for aircraft engines require that the engine be removed from the body of the aircraft and subsequently partially or fully disassembled. As such, these repair methods result in a significant increase in both the time and the costs associated with repairing internal engine components.

However, performing in situ service or repair procedures on gas turbines is complicated because some of the repair or service procedures can unintentionally harm portions of the gas turbine due to fluid or gas based over spray, weld splatter, or waste partials during material removal operations. Accordingly, a system and method for performing an in situ repair of an internal component of a gas turbine engine would be welcomed within the technology.

BRIEF DESCRIPTION OF THE INVENTION

Aspects and advantages of the invention will be set forth in part in the following description, or may be obvious from the description, or may be learned through practice of the invention.

Methods are generally provided for securing a tool within a gas turbine engine. In one embodiment, the method includes inserting a tool into the engine; inserting a bladder between a portion of the tool and a component in the engine; and inflating the bladder to temporarily secure the tool in its position. For example, two tools (or more) can be inserted into the engine and secured by the bladder.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
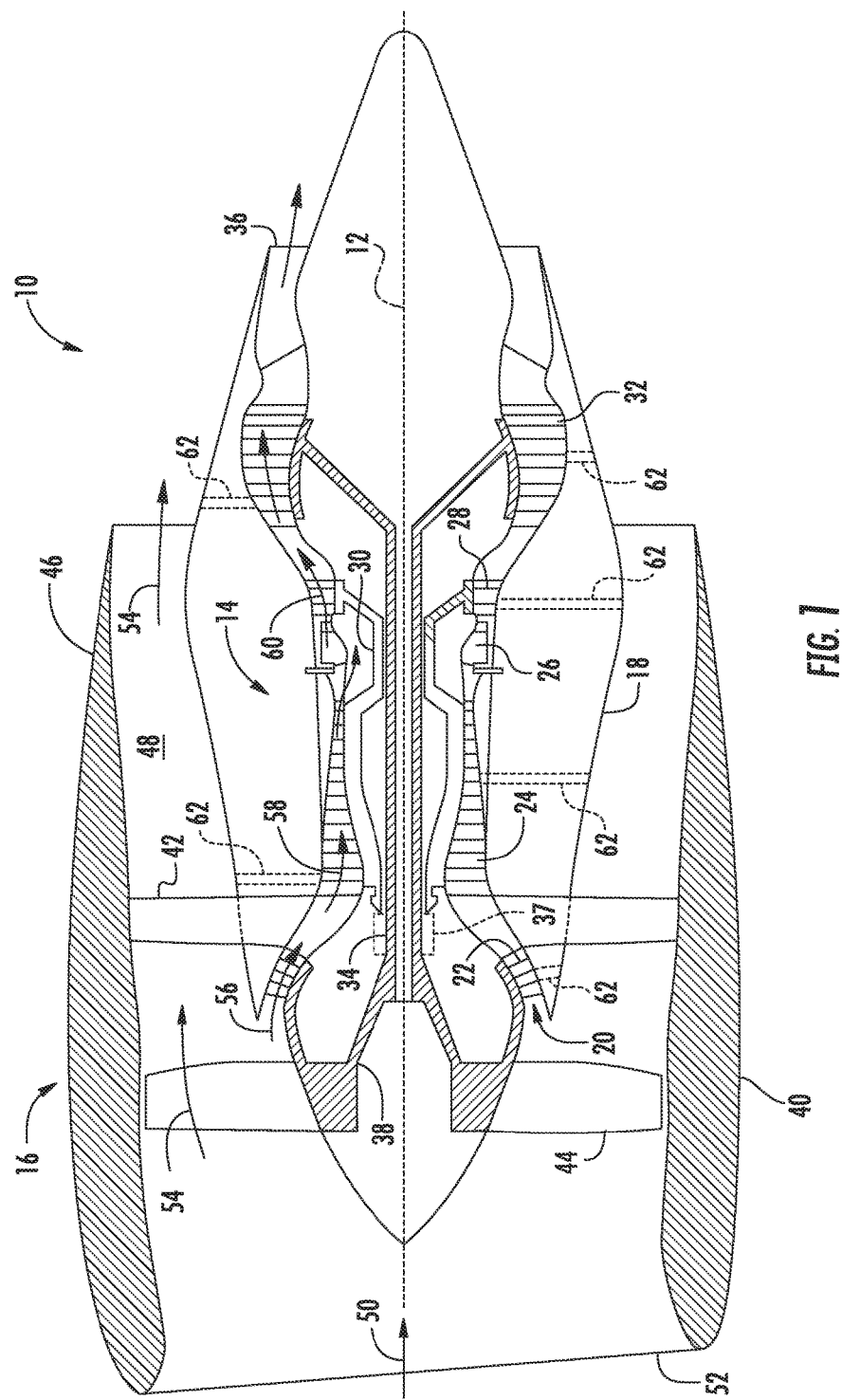
FIG. 1 illustrates a cross-sectional view of one embodiment of a gas turbine engine that may be utilized within an aircraft in accordance with aspects of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In general, a system and method is provided for performing an in situ repair of an internal component of a gas turbine engine. In several embodiments, the system may include a repair tool configured to be inserted through an access port of the gas turbine engine to allow a repair tip or tip end of the tool to be positioned adjacent to a defect of an internal component of the engine, such as a crack, void, distressed area or any other defect defining a fillable volume. As will be described below, the repair tool may be temporarily attached to the surface of the component using an inflated bladder, allowing precision work to be performed on the component. For example, the repair tool can supply a new material and/or a heating element to fill and fuse new material within the crack to repair the defect.

Not only can the inflatable bladder can be utilized to temporarily secure a tool into place within the gas turbine, but also the inflatable bladder may be utilized to form a temporary barrier inside the gas turbine. Having the ability to set up a temporary barrier inside the gas turbine can help reduce the risk of harming unintended regions of the gas turbine during in situ repair. In particular embodiments, for example, two or more barriers can be used to establish an isolated area within the engine. For example, the isolated area can be a washing zone, deposition zone, or other work zone inside the gas turbine. In one embodiment, the washing zone can exposed to rinsing and washing fluids, solvents, and soaps, to locally fill the gas turbine to wash a large region of the gas turbine, while limiting the rinsing and washing from reaching other regions of the gas turbine.

It should be appreciated that the disclosed system and method may generally be used to perform in situ repairs of internal components located within any suitable type of gas turbine engine, including aircraft-based turbine engines and land-based turbine engines, regardless of the engine's current assembly state (e.g., fully or partially assembled). Additionally, with reference to aircraft engines, it should be appreciated that the present subject matter may be implemented on-wing or off-wing.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
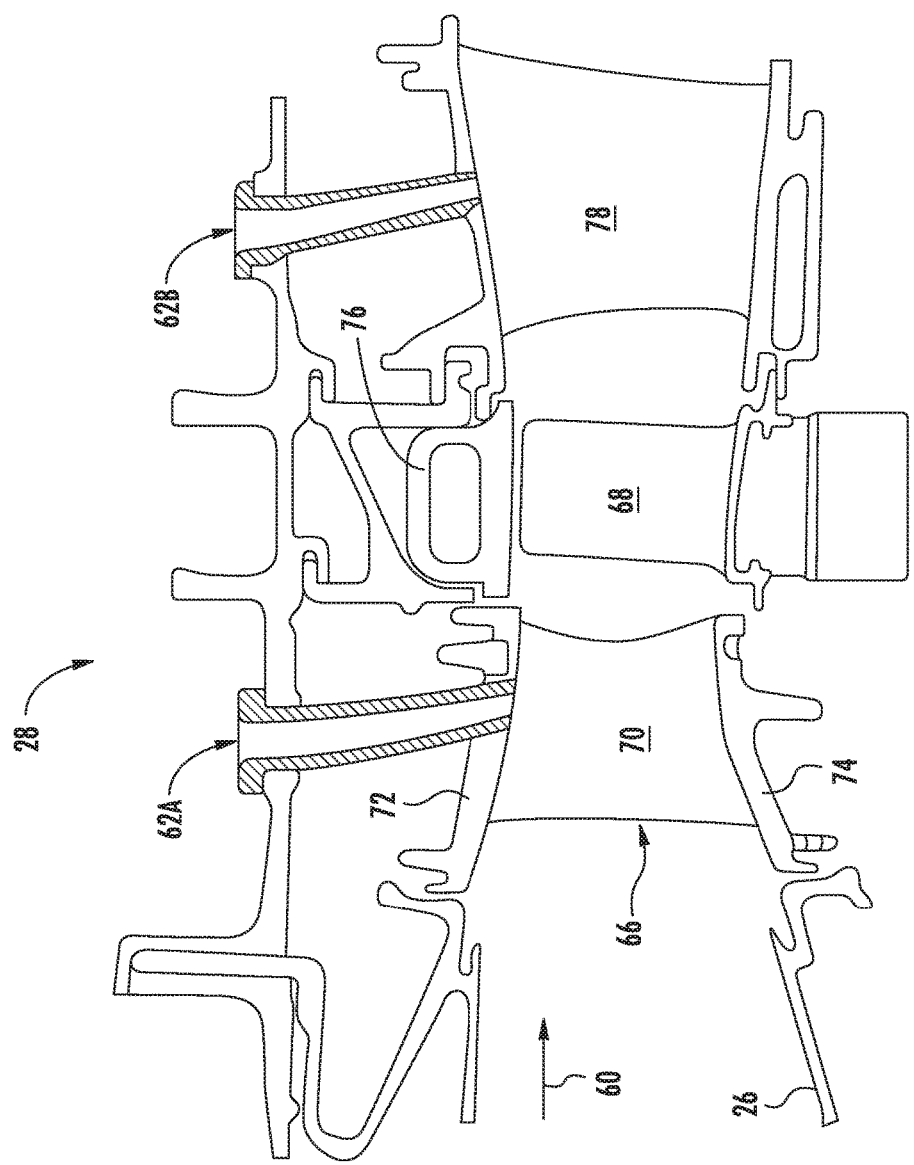
FIG. 2 illustrates a partial, cross-sectional view of one embodiment of a turbine suitable for use within the gas turbine engine shown in FIG. 1, particularly illustrating access ports defined in the engine for providing internal access to the turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62 may be defined through the turbine casing and/or frame, with each access port 62 being configured to provide access to the interior of the turbine 28 at a different axial location. Specifically, as indicated above, the access ports 62 may, in several embodiments, be spaced apart axially such that each access port 62 is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
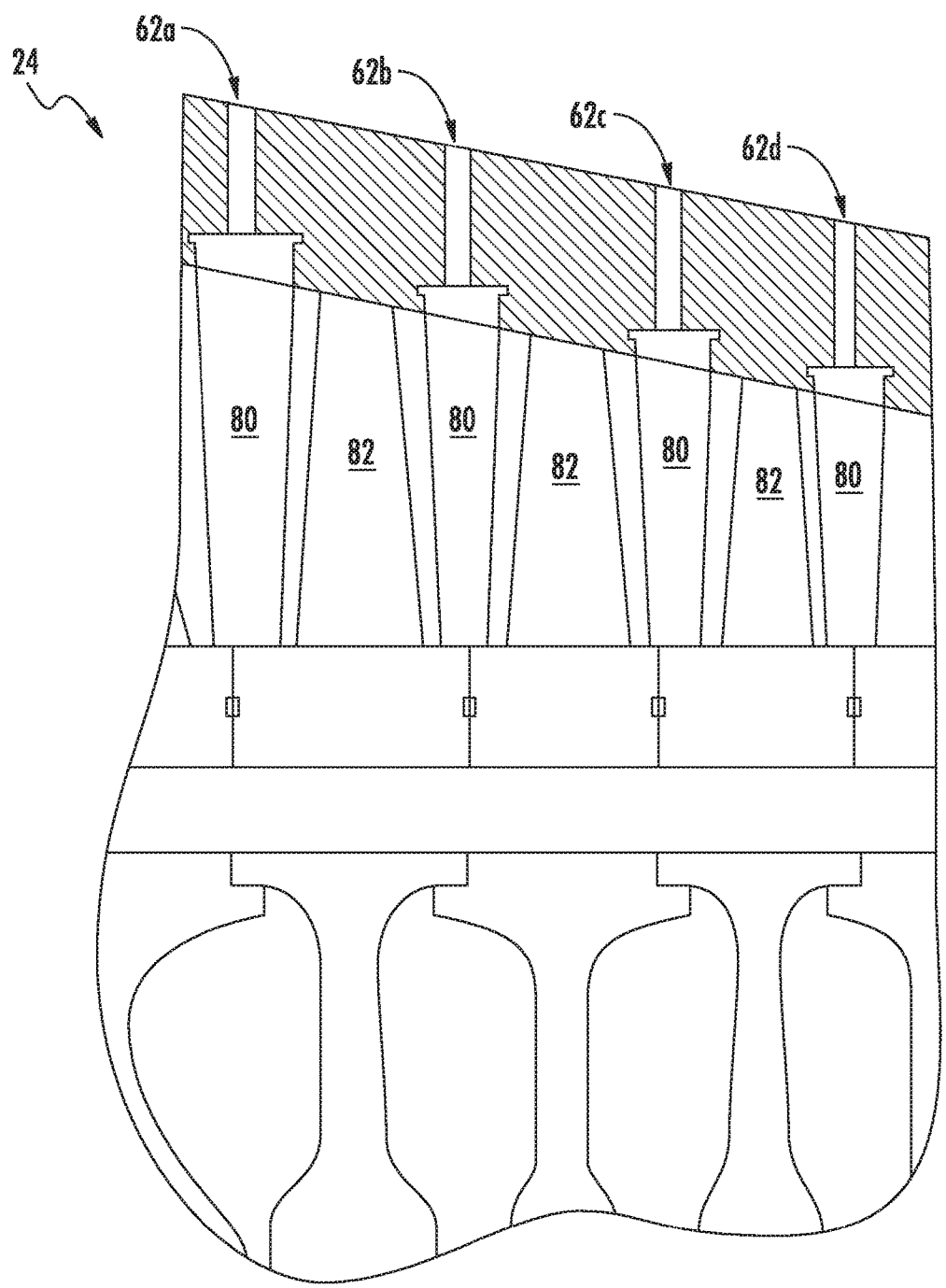
FIG. 3 illustrates a partial, cross-sectional view of one embodiment of a compressor suitable for use within the gas turbine engine shown in FIG. 1, particularly illustrating access ports defined in the engine for providing internal access to the compressor.

Referring now to FIG. 3, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the compressor 24 to the row of compressor blades 82 immediately downstream thereof.

Moreover, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62a, 62b, 62c, 62d are illustrated that provide access to four successive stages, respectively, of the compressor 24.

It should be appreciated that similar access ports 62 may also be provided for any of the other stages of the compressor 24 and/or for any of the stages of the low pressure compressor 22. It should also be appreciated that, in addition to the axially spaced access ports 62 shown in FIG. 3, access ports 62 may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
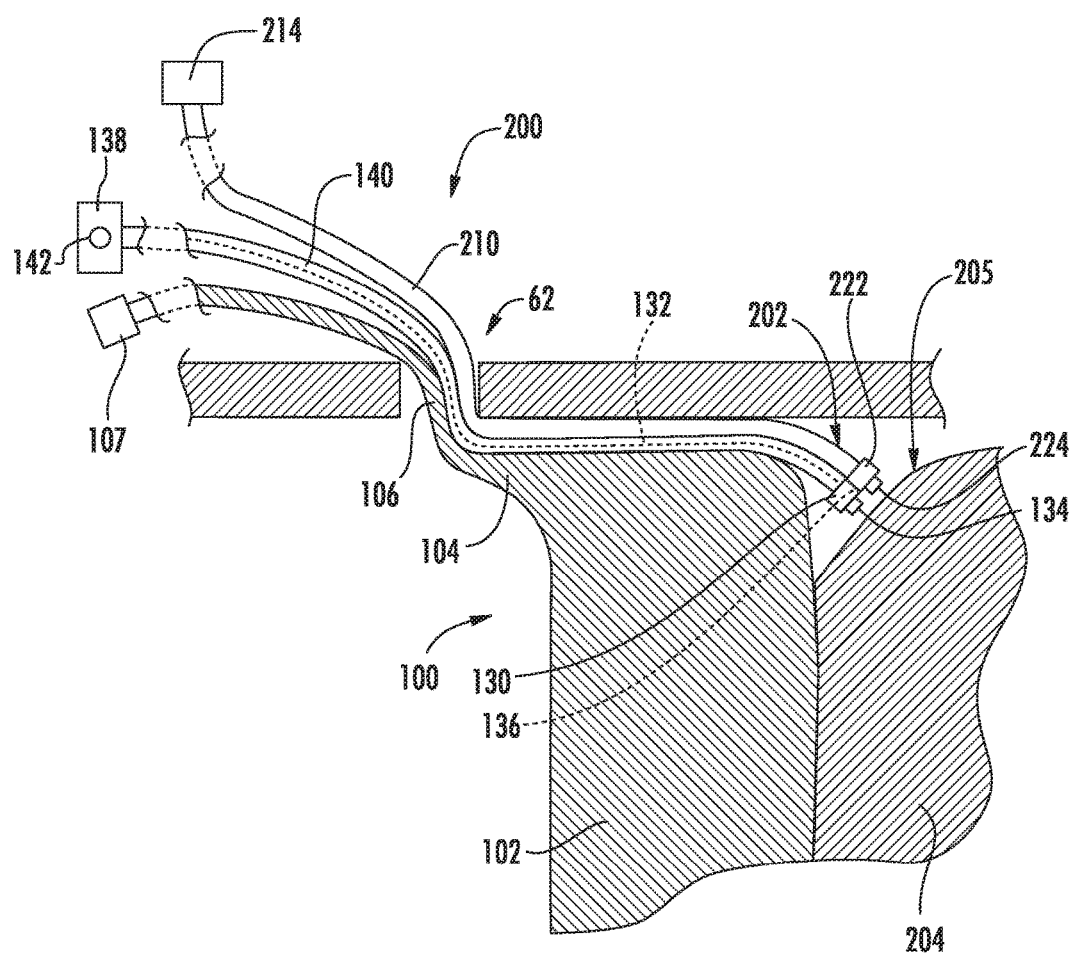
FIG. 4 illustrates a partial, cross-sectional view of one embodiment of an exemplary inflated bladder temporarily securing a repair tool into position for work within the gas turbine engine shown in FIG. 1.

Referring now to FIG. 4, a simplified view of one embodiment of a system 200 for performing an in situ repair of an internal component of a gas turbine engine 10 are illustrated in accordance with aspects of the present subject matter. As shown, the system 200 may include a repair tool 202 configured to be inserted through an access port 62 of the gas turbine engine 10, such as any of the access ports 62 described above with reference to FIGS. 1-3, to allow an in situ repair procedure to be performed on an internal component(s) 204 (e.g., a blade 68 of the engine 10).

In general, the repair tool 202 may correspond to any suitable tool(s) and/or component(s) that may be inserted through an access port 62 of the gas turbine engine 10 and attach onto the surface 205 of the component 204 to perform precision work thereon. For example, a bladder 100 can temporarily secure the repair tool 202 within the engine so that the tool 202 can perform work at or near the surface 205 (e.g., at an identified defect of the internal engine component(s) 204 being repaired). As such, the repair tool 202 may be temporarily secured into a position so as to allow for precision work on the surface 205 (e.g., with precision accuracy within about 0.5 mm or less, such as about 0.25 mm or less). As generically shown in FIG. 4, a conduit 210 is attached to a working head 222 includes a work mechanism 224 controllable via a controller 214 (e.g., a computer or other programmable machine).

In one embodiment, the repair tool 102 includes an optical probe 130 adjacent to the working head 222 and configured to be used in association with the repair tool 202. For instance, as shown in FIG. 4, the optical probe 130 corresponds to a separate component configured to be used in combination with the repair tool 202 for repairing the component 204. However, in other embodiments, the optical probe 130 may be coupled to or integrated within the repair tool 202. Additionally, as shown in FIG. 4, the optical probe 130 has been inserted through the same access port 62 as the repair tool 202. However, in other embodiments, the probe 130 may be inserted into a different access port 62 than the repair tool 202, such as an access port 62 located adjacent to the access port 62 within which the repair tool 202 has been inserted.

In general, the optical probe 130 may correspond to any suitable optical device that allows images of the interior of the engine 10 to be captured or otherwise obtained. For instance, in several embodiments, the optical probe 130 may correspond to a borescope, videoscope, fiberscope or any other similar optical device known in the art that allows for the interior of a gas turbine engine 10 to be viewed through an access port 62. In such embodiments, the optical probe 130 may include one or more optical elements (indicated schematically by dashed box 132), such as one or more optical lenses, optical fibers, image capture devices, cables, and/or the like, for obtaining views or images of the interior of the engine 10 at a tip 134 of the probe 130 and for transmitting or relaying such images from the probe tip 134 along the length of the probe 130 to the exterior of the engine 10 for viewing by the personnel performing the repair procedure on the internal component(s) 204. In addition, the probe 130 may include a light source (indicated by dashed box 136) positioned at or adjacent to the probe tip 134 to provide lighting within the interior of the engine 10.

As shown in FIG. 4, the optical probe 130 may also include an articulation assembly 138 that allows the orientation of the probe tip 134 to be adjusted within the interior of the gas turbine engine 10. For example, the articulation assembly 138 may allow for the probe tip 134 to be rotated or pivoted about a single axis or multiple axes to adjust the orientation of the tip 134 relative to the remainder of the probe 130. It should be appreciated that the articulation assembly 138 may generally have any suitable configuration and/or may include any suitable components that allow for adjustment of the orientation of the probe tip 134 relative to the remainder of the probe 130. For example, in one embodiment, a plurality of articulation cables 140 may be coupled between the probe tip 134 and one or more articulation motors 142. In such an embodiment, by adjusting the tension of the cables 140 via the motor(s) 142, the probe tip 134 may be reoriented within the gas turbine engine 10.

As shown in FIG. 4, the component 204 is an airfoil tip with a known shape and size (e.g., a nozzle and/or blade). In other embodiments, the component 204 can be a trailing edge and/or leading edge of the airfoil.

Through the bladder 100, the location of repair tool 202 can be precisely controlled and temporarily secured in place, which allows for precision work to be performed. In one embodiment, a working head 222 is positioned and secured adjacent to an identified defect of the internal engine component(s) 104 being repaired (e.g., a turbine blade(s)). For example, the defect can correspond to a crack, void or other defective area formed along the exterior of the component 204 that defines an open or fillable volume with a base of the crack, void or other defective area.

The working head 222 includes a work mechanism 224 configured for addressing the component 204. In one embodiment, the new material can be supplied from a location exterior to the engine to the internal location of a defect to allow the fillable volume defined by the defect to be filled with the new material. For example, the repair tool 202 can be configured to supply high velocity powder particles from the exterior of the engine into the fillable volume of the defect. Upon impacting a surface of the defect, the high velocity particles may plastically deform and adhere to the surface, thereby filling-in the fillable volume and repairing the defect. For example, the particles can impact the surface within the defect 106 at a speed of about 150 meters per second (m/s) to about 900 m/s.

Figure 5:
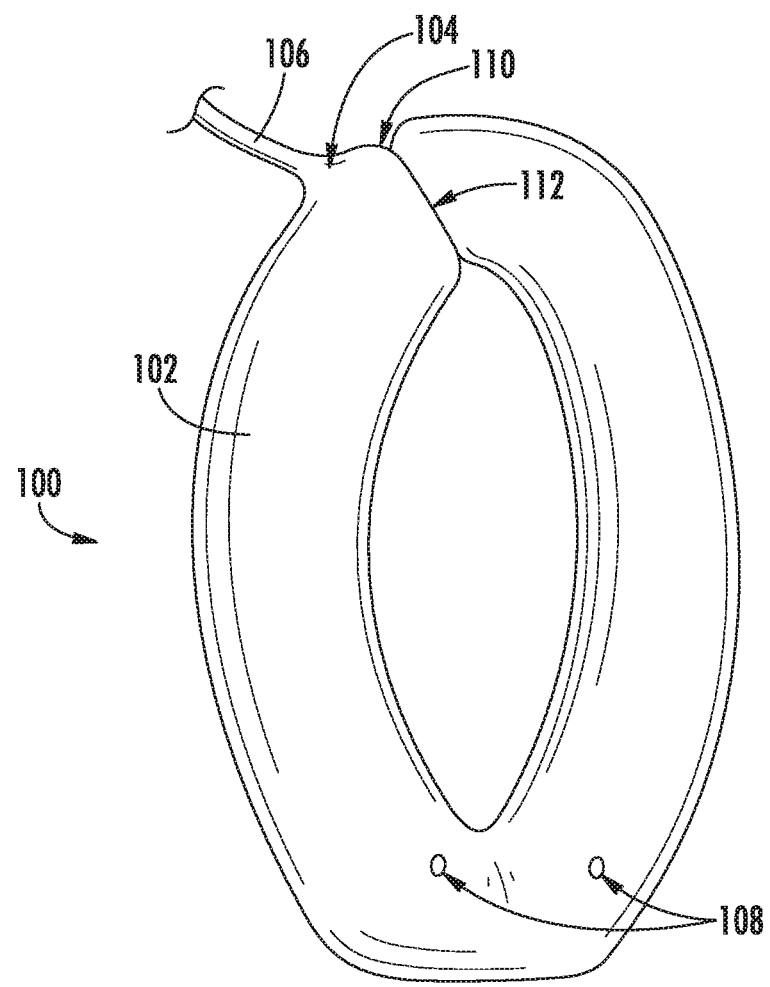
FIG. 5 illustrates a perspective view of an exemplary inflated bladder for use within the gas turbine engine shown in FIG. 1.

The bladder 100 is installed within the engine 10, and in certain embodiments may form a circumferential seal therein. Referring to FIGS. 4 and 5, the bladder 100 is installed and positioned adjacent to the between the plurality of first stage turbine nozzles 66 and the annular array of rotating turbine blades 68. For example, the first bladder 100 may be installed by inserting the first bladder 100, in an uninflated state, through one of the access ports 62. Then, the bladder 100 can be inflated using an inflating fluid, such as a liquid, foam, a gas from a source 107.

Generally, the bladder is inflated by supplying the fluid through an inlet 104 via a supply tube 106 from a fluid source 107. In the embodiment of FIG. 5 with respect to the bladder, the supply tube 106 is integral to the bladder body 102 so as to inflate the bladder body 102 between a first end 110 and a second end 112. Upon inflation, the bladder body 102 expands in its respective circumferential direction and in its respective longitudinal direction between the first end 110 and a second end 112. Thus, the inflated bladder body 102 fills the local space within the engine within which it is positioned. For example, the inflated bladder body 102 can extend between adjacent components within the engine (e.g., a row of stator vanes and an annular array of rotating blades, while contacting the arcuate outer band 72 and arcuate inner bands 74 as shown in FIG. 2). Additionally, the expansion in its respective longitudinal direction allows the bladder body 102 to expand circumferentially within the engine such that the first end 110 contacts the second end 112 to form a seal therebetween. In the embodiment shown, the inlet 104 is positioned at the first end 110 of the bladder body 102. In this embodiment, the second end 112 can be inserted as desired within the engine, with the bladder body 102 trailing. For example, the second end 112 can be attached to a fiber optic cable delivery system (not shown) and positioned within the engine as desired. However, in other embodiments, the inlet 104 can be positioned in another position on the bladder body 102.

In one embodiment, the material of the bladder 100 may be a fluid impermeable (e.g., a liquid impermeable material and/or a gas impermeable). In another embodiment, the material of the bladder 100 may be somewhat impermeable to the inflating fluid so as to allow for slow passing of the fluid through the bladders (e.g., at a flow through rate that is slower than the supply rate of the inflating fluid). The bladder 100 can be constructed of a deformable material, such as a plastic material (e.g., a plastic film, a plastic fibrous web, etc.), a rubber material, a paper material (e.g., a saturated paper material), or another material.

In one embodiment, at least one exit port 108 may be included in the bladder body 102 as shown in FIG. 5. Such an exit port 108 may be configured to supply the inflating fluid into the engine, particularly as in the embodiments shown in FIGS. 2 and 3 so as to supply the inflating fluid into the isolated area. As stated, the first bladder 100 can be inflated using an inflating fluid, such as a liquid, foam, a gas. For example, in one embodiment, the inflating fluid can include water, an inert gas, a cleaning fluid, etc. In one embodiment, the inflating fluid can include particular material, such as organic material (e.g., wood chips, wood pellets, nut shells, or a mixture thereof). As such, the engine (e.g., the isolated compartment) may be exposed to a desired material, such as a cleaning agent, an abrasive agent, etc.

The inflating fluid can be supplied through the inlet 104 at a supply rate of fluid flow that is greater than (i.e., faster than) the fluid outflow rate through the exit ports 108. As such, the bladder body 102 may remain in its fully inflated state so as to keep the circumferential seal within the engine while still supplying the inflated fluid into the engine through the exit port 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of securing a tool within a gas turbine engine, the method comprising:
    inserting the tool into the engine;
    inserting a bladder between a portion of the tool and a component in the engine;
    inflating the bladder to temporarily secure the tool in its position; and
    wherein the inflating fluid comprises an organic material comprising wood chips, wood pellets, nut shells, or a mixture thereof.

2. The method as in claim 1, wherein the bladder is positioned between a row of blades and a row of stator vanes.

3. The method as in claim 1, wherein the bladder is positioned between a blade tip and a shroud.

4. The method as in claim 1, wherein the tool includes a working head.

5. The method as in claim 4, wherein the working head includes a drill, a heater, a laser, a spray head, or a combination thereof.

6. The method as in claim 1, wherein the wherein the bladder comprises a plastic material.

7. The method as in claim 6, wherein the plastic material is a film or a fibrous web.

8. The method as in claim 1, wherein the bladder comprises a rubber material.

9. The method as in claim 1, wherein the bladder comprises a paper material.

10. The method as in claim 1, wherein the bladder forms a circumferential seal within the gas turbine engine.

11. The method as in claim 1, wherein the bladder is locally positioned within the gas turbine engine so as to secure the tool in its position.

12. The method as in claim 11, wherein the bladder is attached to the tool.

13. The method as in claim 1, wherein the tool is attached to a cable delivery system comprising a working head attached to a delivery cable.

14. The method as in claim 13, further comprising:
    inflating a plurality of bladders to temporarily secure the working head in its position and the delivery cable in at least one location.

15. A method of securing multiple tools within a gas turbine engine, the method comprising:
    inserting a first tool into the engine;
    inserting a second tool into the engine;
    inserting a bladder between a portion of the first tool and a component in the engine and between a portion of the second tool and a component in the engine;
    inflating the bladder to temporarily secure the first tool and the second tool in their respective positions; and
    wherein the inflating fluid comprises an organic material comprising wood chips, wood pellets, nut shells, or a mixture thereof.

16. The method as in claim 15, wherein the first tool and the second tool are positioned to work together on the component.

17. The method as in claim 15, wherein the bladder is locally positioned within the gas turbine engine so as to secure the first tool and the second tool in their respective positions.

18. The methods as in claim 15, wherein the bladder forms a circumferential seal within the gas turbine engine.

* * * * *